United States Patent
Kawano et al.

(10) Patent No.: US 11,010,618 B2
(45) Date of Patent: May 18, 2021

(54) APPARATUS FOR IDENTIFYING LINE MARKING ON ROAD SURFACE

(71) Applicant: DENSO CORPORATION, Kariya (JP)

(72) Inventors: Taiki Kawano, Nisshin (JP); Shunsuke Suzuki, Kariya (JP); Shunya Kumano, Nisshin (JP); Akihiro Watanabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 323 days.

(21) Appl. No.: 16/221,984

(22) Filed: Dec. 17, 2018

(65) Prior Publication Data

US 2019/0188497 A1 Jun. 20, 2019

(30) Foreign Application Priority Data

Dec. 18, 2017 (JP) .............................. JP2017-241901

(51) Int. Cl.
*G06K 9/00* (2006.01)
*H04N 5/357* (2011.01)
(Continued)

(52) U.S. Cl.
CPC ......... *G06K 9/00798* (2013.01); *B60W 30/12* (2013.01); *G06K 9/00791* (2013.01);
(Continued)

(58) Field of Classification Search
CPC .. G06K 9/00; G06K 9/00624; G06K 9/00651; G06K 9/00785; G06K 9/00791; G06K 9/00798; G06K 9/00805; G06K 9/00812; G06K 9/46; G06K 9/4604; G06K 9/4633; G06K 9/4638; G06T 7/00; G06T 7/10; G06T 7/13; G06T 7/174; G06T 7/181; G06T 7/187; G06T 7/20; G06T 7/60;
(Continued)

(56) References Cited

U.S. PATENT DOCUMENTS

| | | | |
|---|---|---|---|
| 6,930,593 B2* | 8/2005 | Crawshaw | G06K 9/00798 340/435 |
| 8,204,276 B2* | 6/2012 | Higuchi | G06K 9/00798 382/104 |

(Continued)

FOREIGN PATENT DOCUMENTS

JP 2013-047934 A 3/2013

*Primary Examiner* — Eric Rush
(74) *Attorney, Agent, or Firm* — Maschoff Brennan

(57) ABSTRACT

An apparatus for identifying a line marking on a road surface. In the apparatus, an extractor extracts a paint candidate that is a candidate for road surface paint used to identify a line marking in an image captured by a camera mounted on a vehicle to capture an image of an area including a road surface ahead of the vehicle. A determiner determines whether or not the paint candidate has at least one predefined flare feature. A line marking identifier identifies a line marking using the paint candidate which meets an identification condition used to identify a line marking. The line marking identifier sets the identification condition to be more stringent for a flare paint candidate that is the paint candidate determined by the determiner to have the at least one predefined flare feature than for the paint candidate determined by the determiner to have no predefined flare feature.

10 Claims, 7 Drawing Sheets

(51) Int. Cl.
   *G06T 7/70* (2017.01)
   *G08G 1/16* (2006.01)
   *G06K 9/46* (2006.01)
   *G06T 7/181* (2017.01)
   *G06T 7/187* (2017.01)
   *B60W 30/12* (2020.01)

(52) U.S. Cl.
   CPC ......... *G06K 9/4604* (2013.01); *G06K 9/4638* (2013.01); *G06T 7/181* (2017.01); *G06T 7/187* (2017.01); *G06T 7/70* (2017.01); *G08G 1/167* (2013.01); *H04N 5/3572* (2013.01); *B60R 2300/804* (2013.01); *B60T 2201/089* (2013.01); *G06T 2207/30256* (2013.01)

(58) Field of Classification Search
   CPC ... G06T 7/70; G06T 7/97; G06T 2207/30236; G06T 2207/30248; G06T 2207/30252; G06T 2207/30256; H04N 5/235; H04N 5/2351; H04N 5/3572; G08G 1/00; G08G 1/16; G08G 1/165; G08G 1/166; G08G 1/167; G08G 1/168; B60W 30/06; B60W 30/10; B60W 30/12; B60W 30/18163; B60R 2300/804; B62D 15/025; B62D 15/0255; B60T 2201/08; B60T 2201/089

USPC ....... 382/100, 103, 104, 173, 181, 190, 199, 382/201–203, 224, 226, 258, 259, 274, 382/289, 291; 340/901, 904, 905, 907, 340/935, 937, 425.5, 435–437, 463–465; 701/1, 23, 28, 41, 52, 53, 116, 117, 514, 701/523, 300, 301; 348/113, 118, 119, 348/148; 180/167–169
   See application file for complete search history.

(56) References Cited

U.S. PATENT DOCUMENTS

| | | | |
|---|---|---|---|
| 8,456,327 B2* | 6/2013 | Bechtel | G06K 9/2018 340/937 |
| 8,924,078 B2* | 12/2014 | Jeromin | G06K 9/2018 382/173 |
| 9,344,691 B2* | 5/2016 | Hirai | G06K 9/00791 |
| 9,721,460 B2* | 8/2017 | Takemura | G06K 9/00791 |
| 2010/0079612 A1* | 4/2010 | Kimura | H04N 5/235 348/222.1 |
| 2013/0027511 A1 | 1/2013 | Takemura et al. | |

* cited by examiner

APPARATUS FOR IDENTIFYING LINE MARKING ON ROAD SURFACE

CROSS-REFERENCE TO RELATED APPLICATION

This application is based on and claims the benefit of priority from earlier Japanese Patent Application No. 2017-241901 filed on Dec. 18, 2017, the description of which is incorporated herein by reference.

BACKGROUND

Technical Field

This disclosure relates to an apparatus for identifying line marking on road surface.

Related Art

In recent years, line marking identification apparatuses are known that identify line markings on a surface of a road on which a vehicle is traveling using captured images acquired from a vehicle-mounted camera. These line marking identification apparatuses are used to notify a driver of the vehicle of information based on the identified line markings, thereby preventing deviation of the vehicle from the line markings.

During travel of the vehicle at nighttime, strong light emitted from light sources, such as headlights, of an oncoming vehicle is often incident on the vehicle-mounted camera, which may cause flare in captured images. Flare may incorrectly be identified as a line marking, which may compromise correct lane marking identification. To address such an issue, a vehicle environment recognition apparatus has been proposed in JP-A-2013-47934, which is configured to exclude flare areas subject to flare caused by reflected light from a road surface from areas of interest, such as line markings, on which recognition processing is performed, thereby preventing mis-recognition of line markings and the like.

However, in the vehicle environment recognition apparatus disclosed in JP-A-2013-47934, each time strong light causing flare is captured, an area of the strong light in a captured image becomes a flare area. Thus, in a situation where there are many such flare areas, there are many areas on which recognition processing is not performed in the captured image, which may compromise line marking identification.

In view of the above, it is desired to have a line marking identification apparatus that can identify line markings even in a situation where a captured image is more susceptible to light-caused flare.

SUMMARY

One aspect of the disclosure provides an apparatus for identifying a line marking on a road surface. In the apparatus, an extractor is configured to extract a paint candidate that is a candidate for road surface paint used to identify a line marking in an image captured by a camera mounted on a vehicle to capture an image of an area including a road surface ahead of the vehicle. A determiner is configured to determine whether or not the paint candidate has at least one predefined flare feature. A line marking identifier is configured to identify a line marking using the paint candidate which meets an identification condition used to identify a line marking. The line marking identifier is configured to set the identification condition to be more stringent for a flare paint candidate that is the paint candidate determined by the determiner to have the at least one predefined flare feature than for the paint candidate determined by the determiner to have no predefined flare feature.

With this configuration, if the flare paint candidate meets a more stringent identification condition, the flare paint candidate is used in line marking identification processing without being excluded, which enabling identification of the line marking even in a situation where the captured image is more susceptible to light-caused flare.

DESCRIPTION OF SPECIFIC EMBODIMENTS

With reference to the accompanying drawings, hereinafter are described several embodiments of the present disclosure. Substantially common elements or steps throughout the embodiments are assigned the same numbers and will not be redundantly described.

1. First Embodiment

1-1. Configuration

Figure 1:
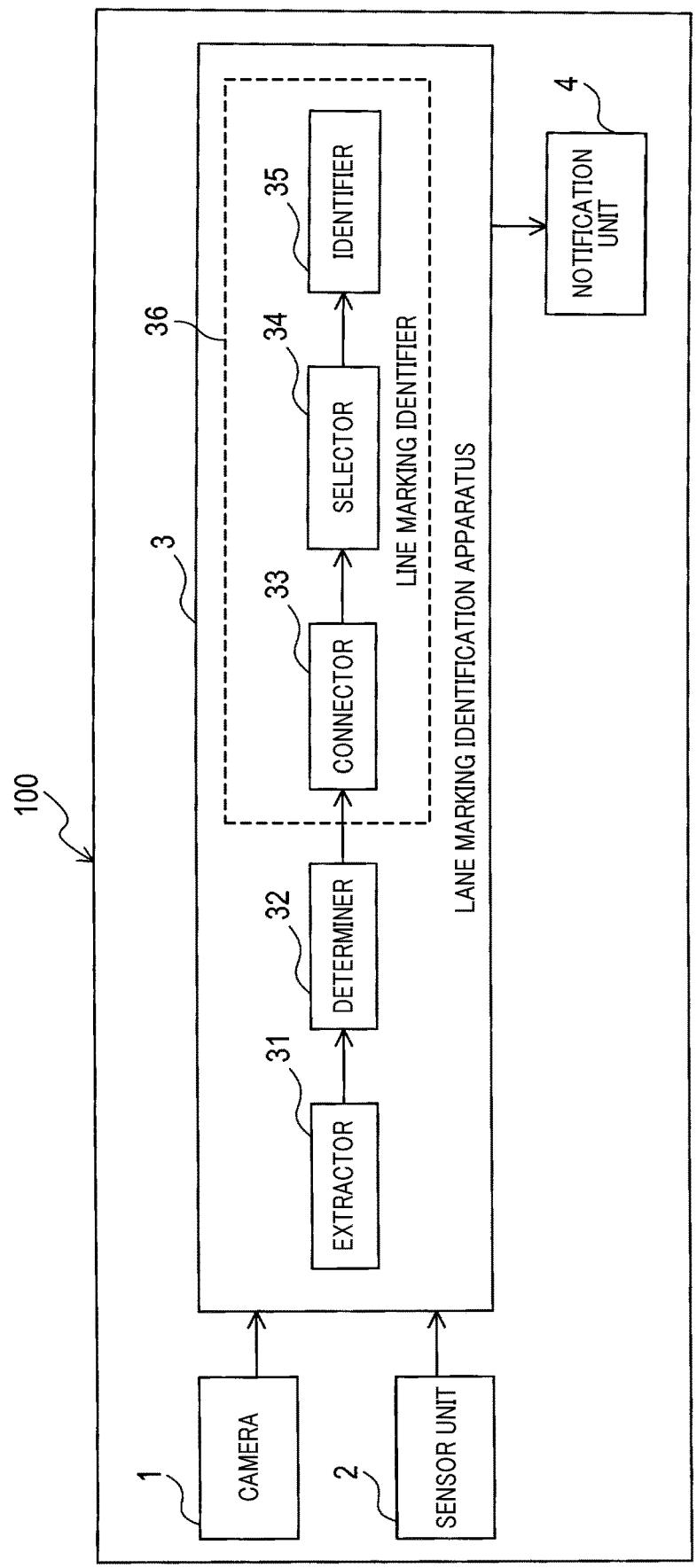
FIG. 1 is a block diagram of a vehicle in accordance with a first embodiment of the present disclosure.

A vehicle 100 shown in FIG. 1 includes a camera 1, a sensor unit 2, a line marking identification apparatus 3, and a notification unit 4.

The camera 1 is a forward-looking camera disposed near a front center of the vehicle 100 to capture images of an area including a roadway surface ahead of the vehicle 100 and sequentially output image data regarding the captured images to the line marking identification apparatus 3.

The sensor unit 2 is formed of a set of sensors adapted to detect information needed to assist driving the vehicle 100. The sensor unit 2 includes a vehicle speed sensor and a yaw rate sensor for detecting an angular speed around a center axis of the vehicle 100 during travel of the vehicle.

The line marking identification apparatus 3 is configured to identify line markings on a road surface using captured images from the camera 1. In the present embodiment, the line marking identification apparatus 3 is configured to identify both a left and a right lane marking of a lane in which the vehicle 100 is traveling. Each line marking may be continuous or broken, white or yellow line. The line marking identification apparatus 3 may be formed of one or more microcomputers, each incorporating therein a central processing unit (CPU) and a semiconductor memory that is a non-transitory computer readable storage medium (e.g., random access memory (RAM), read only memory (ROM), and flash, etc.). Various functions of the line marking identification apparatus 3 may be implemented by the CPU executing programs stored in the memory, thereby performing processing described later.

The line marking identification apparatus 3 includes, as functional blocks that can be implemented by the CPU executing the programs stored in the memory, an extractor 31, a determiner 32, a connector 33, a selector 34, and an identifier 35. The connector 33, the selector 34, and the identifier 35 form a line marking identifier 36. These functional blocks may be implemented by software only, hardware only, or a combination thereof. For example, when these functions are provided by an electronic circuit which is hardware, the electronic circuit can be provided by a digital circuit including many logic circuits, an analog circuit, or a combination thereof.

The extractor 31 is configured to extract paint candidates from a captured image from the camera 1. The paint candidates refer to candidates for road surface paint used in lane marking identification processing described later. The road surface paint refers to a traversable paint drawn in white, yellow or other bright color on a road surface to indicate a line marking or a road sign. In the present embodiment, the line marking paint refers to road surface paint drawn as a line marking on a road surface. For example, in the case where the line marking is a continuous line, the continuous line corresponds to line marking paint. In the case where the line marking is a broken line, each of a plurality of continuous line segments forming the broken line corresponds to line marking paint.

A method of extracting paint candidates will now be described. The extractor 31 horizontally scans a captured image using a well-known calculation formula. The extractor 31 extracts edge points where an amount of change in luminance value is equal to or greater than a threshold Th0. The extractor 31 applies the Hough transform or the like to the extracted edge points to extract edges of paint candidates, thereby extracting the paint candidates in the captured image. In the captured image, an area having higher luminance values than its surroundings is extracted as a paint candidate.

The determiner 32 is configured to determine whether or not a paint candidate extracted by the extractor 31 has at least one predefined flare feature. The flare feature is a feature specific to flare. In the present embodiment, the determiner 32 is configured to determine whether or not a paint candidate has at least one of the following three flare features.

A first flare feature is that the inclination of a paint candidate to the vertical direction in the captured image is within a predetermined range, for example, in the present embodiment, within a range of 0 to 30 degrees. In a captured image, a longitudinal direction of flare caused by strong light emitted from headlights of an oncoming vehicle may often be in a direction closer to the vertical direction of the captured image. Thus, the determiner 32 is configured to, if the inclination of a paint candidate to the vertical direction in the captured image is within a range of 0 to 30 degrees, determine that the paint candidate has the first flare feature that is one of the three features.

The inclination of a paint candidate to the vertical direction is determined based on the inclination of a closer-to-vehicle one of a left and a right edge line of the paint candidate, that is, the inclination of a laterally, centrally located one of a left and a right edge line of the paint candidate. The inclination of the closer-to-vehicle edge line may be determined to calculate a ratio of the number of pixels of the closer-to-vehicle edge line in the vertical direction to the number of pixels of the closer-to-vehicle edge line in the horizontal direction in the captured image.

A second flare feature is that a light source is located at the longitudinal extent of a paint candidate in the captured image. Since flare is caused by strong light emitted from headlights of an oncoming vehicle, a light source may often be located at the longitudinal extent of a paint candidate in the captured image and flare and the light source may often be extracted as one paint candidate. The light source has a higher luminance value than flare. The determiner 32 is thus configured to determine whether or not there is a light source associated with a paint candidate, that is, whether or not a paint candidate has an area whose luminance value is higher than a predetermined luminance value. The determiner 32 is configured to, if determining that there is a light source associated with the paint candidate, determine whether or not the light source is located at the longitudinal extent of the closer-to-vehicle edge line of the paint candidate in the captured image. As an example, if the upper end of the closer-to-vehicle edge line of the paint candidate is in contact with the light source, it may be determined that the light source is located at the longitudinal extent of the paint candidate in the captured image. If determining that the light source is located at the longitudinal extent of the paint candidate in the captured image, the determiner 32 determines that the paint candidate has the second flare feature that is one of the three features.

A third flare feature is that a contrast of a paint candidate is much higher than contrasts of its peripheral paint candidates. For example, luminance values of a plurality of line marking paints forming a broken line may often be equal or close to each other. Therefore, the determiner 32 is configured to search for peripheral paint candidates located at distances equal to or less than a predetermined distance from a paint candidate to be determined. The determiner 32 is configured to, if there are two or more peripheral paint candidates, determines whether or not the paint candidate to be determined has the third flare feature in the following manner. More specifically, for each of the paint candidate to be determined and the two or more peripheral paint candidates, the determiner 32 calculates a difference between a luminance value of the paint candidate and a luminance value of a peripheral area of the paint candidate as a contrast. The determiner 32 is configured to, if the number of paint candidates having a contrast within a range of interest is less than the number of paint candidates having a contrast outside the range of interest, determine that the paint candidate to be determined has the third flare feature. The range of interest is a predetermined contrast range based on the contrast of the paint candidate to be determined. In an alternative embodiment, instead of using a difference between a luminance value of the paint candidate and a luminance value of peripheral area of the paint candidate, a difference in luminance value between the paint candidates may be used as a contrast.

In such a manner, the determiner 32 determines whether or not a paint candidate has at least one of the first to third flare features. That is, for each paint candidate, the determiner 32 determines whether or not the paint candidate is a flare paint candidate that is a paint candidate having at least one of the first flare feature, the second flare feature, and the third flare feature.

The connector 33 is configured to, for each of the paint candidates, determine whether or not the paint candidate is line marking paint using an identification condition. Subsequently, the connector 33 sequentially connects the paint candidates identified as marking paint.

In the present embodiment, the identification condition is that a consolidated value (described later) indicative of how much a paint candidate has features of line marking paint exceeds a threshold Th1 based on which a determination is made as to whether or not the paint candidate has marking paint features. In the present embodiment, features of line marking paint are acquired based on the inclination, a location, and a width of a paint candidate. Based on information related to the previously identified lane markings, the connector 33 calculates a line marking paint measure that is a measure of how much the paint candidate has features of line marking paint for each of the inclination of the paint candidate, a location of the paint candidate, and a width of the paint candidate. That is, the connector 33 calculates three types of measures. The connector 33 calculates a consolidated value that combines the three types of measures. If the consolidated value exceeds the threshold Th1, the connector 33 identifies the paint candidate as line marking paint.

The connector 33 sequentially connects the paint candidates identified as line marking paint to generate a connection line. More specifically, based on information related to the previously identified lane markings, the line marking identification apparatus 3 connects a plurality of paint candidates identified as line marking paint to generate a connection line. In the present embodiment, at least two paint candidates located one above another in the vertical direction within a predetermined distance are said to be located close to each other. That is, the connector 33 sequentially connects a plurality of paint candidates forming a line marking that is a broken line. In the case where the paint candidate is a line marking that is not a broken line, but a continuous line, the connector 33 determines a closer-to-vehicle edge line of the line marking as a connection line. A method of connecting the paint candidates will be described in more detail in the description regarding lane marking identification processing described later.

The connector 33 is configured to set a more stringent identification condition for flare paint candidates that are paint candidates determined as having at least one of the first flare feature, the second flare feature, and the third flare feature than an identification condition set for paint candidates having no flare features. More specifically, the connector 33 sets the threshold Th1 to a higher value for the flare paint candidates than a threshold set for the paint candidates having no flare features. For example, the connector 33 may set the threshold Th1 to 40% for the paint candidates determined as having no flare features while the connector 33 may set the threshold Th1 to 80% for the flare paint candidates.

The selector 34 is configured to select a marking connection line from the connection lines generated by the connector 33, based on a predetermined condition including, for example, a shape and a location of the connection line in the captured image 200. The marking connection line is a connection line representing a lane marking.

The identifier 35 is configured to, based on information related to the marking connection line selected by the selector 34, identify a lane marking using a filter. More specifically, the identifier 35 is configured to calculate marking parameters of the marking connection line selected by the selector 34 by means of an extended Kalman filter using a specific line marking model. The marking parameters may include a curvature of the lane marking, an offset position of the lane marking, a line width of the lane marking, a yaw angle, and a pitch angle and the like. The identifier 35 is configured to identity a lane marking by approximating the connection line by a smooth line.

The notification unit 4 includes a set of a speaker, a display and the like installed within a passenger compartment of the vehicle for providing information to a driver of the vehicle 100. The notification unit 4 is configured to, if it is determined based on the marking parameters calculated by the line marking identification apparatus 3 that the vehicle 100 has deviated from the line marking, notify the driver of the vehicle 100 of the deviation of the vehicle 100 from the line marking in an audible or visible manner.

1-2. Lane Marking Identification Processing

Figure 2:
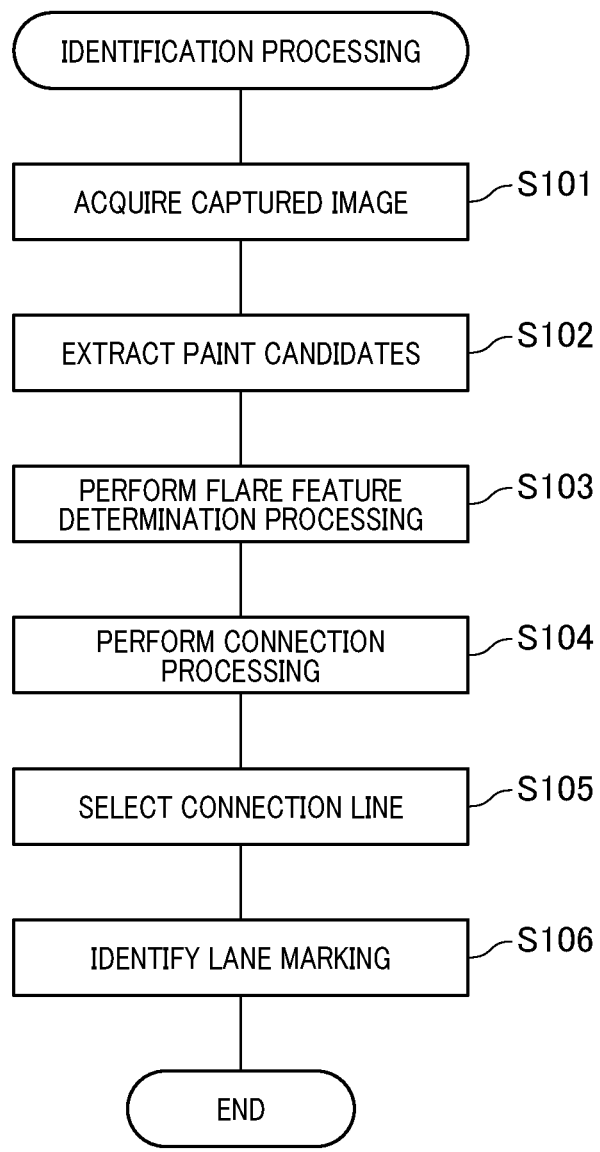
FIG. 2 is a flowchart of lane marking identification processing of the first embodiment.

Lane marking identification processing performed by the line marking identification apparatus 3 will now be described with reference to a flowchart of FIG. 2. The lane marking identification processing is performed by the line marking identification apparatus 3 each time a captured image is acquired from the camera 1.

At step S101, the line marking identification apparatus 3 acquires a captured image from the camera 1. In an example shown in FIG. 3, the line marking identification apparatus 3 acquires a captured image 200. The captured image 200 includes flare caused by incident strong light emitted from headlights 73 of an oncoming vehicle 7 during travel of the vehicle 100 at nighttime.

At step S102, the line marking identification apparatus 3 extracts paint candidates in the captured image. In the example of the captured image 200 shown in FIG. 3, paint candidate 61-66, 71, 72, 81 are extracted. The paint candidates 61-63 are line marking paints forming a line marking and the paint candidates 64-66 are line marking paints forming another line marking. The paint candidates 71, 72 are strong light emitted from the headlights 73 and flare caused by the strong light. The paint candidate 81 is line marking paint forming a line marking (such as a center line or the like) that is not a lane marking. The extractor 31 is responsible for executing step S102.

Figure 3:
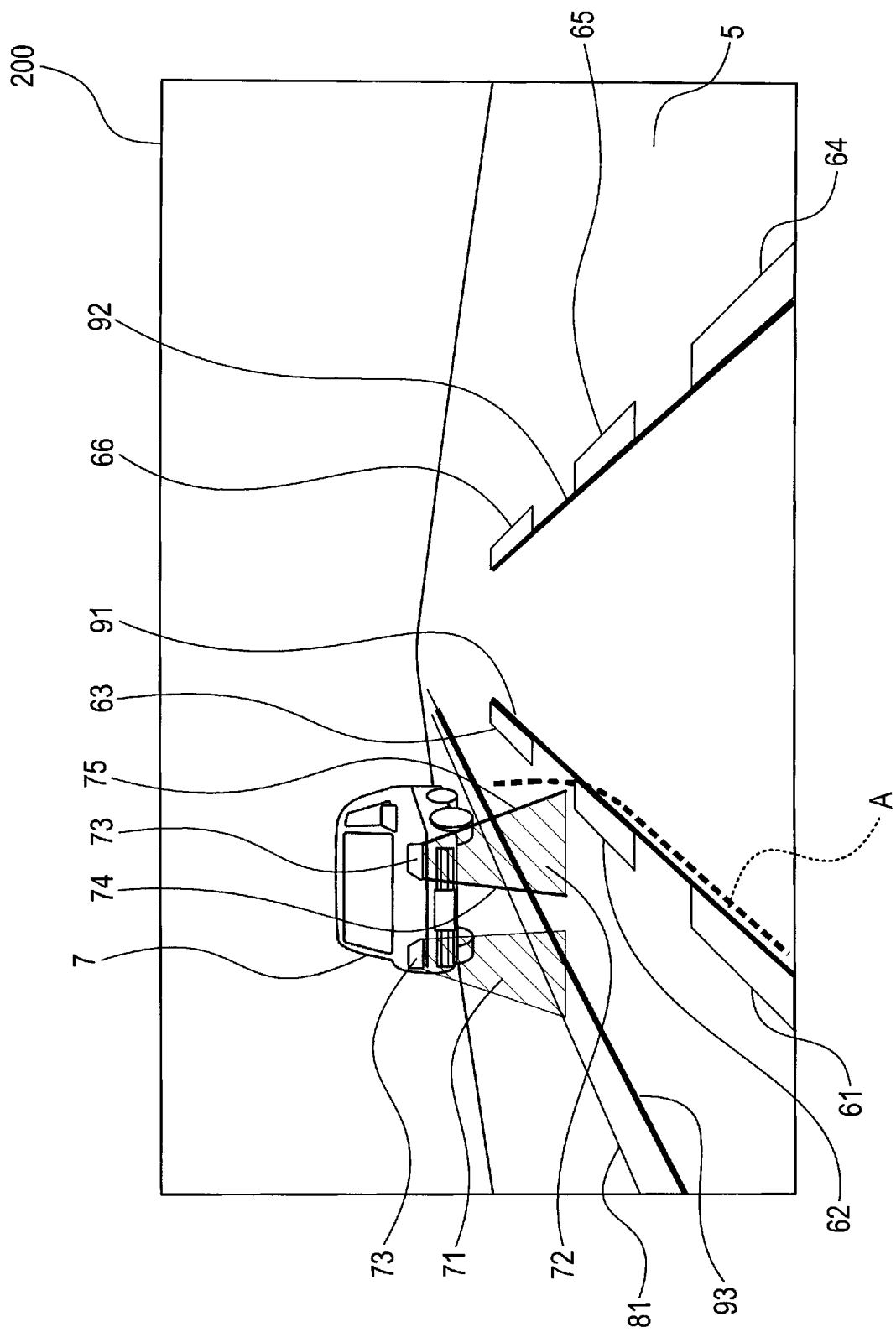
FIG. 3 is an example of a captured image of the first embodiment.

At step S103, the line marking identification apparatus 3 performs flare feature determination processing described later to determine, for each paint candidate, whether or not the paint candidate has at least one of the first flare feature, the second flare feature, and the third flare feature. In the example of FIG. 3, the line marking identification apparatus 3 determines that each of the paint candidates 61-66, 81 has none of the first flare feature, the second flare feature, and the third flare feature and each of the paint candidates 71, 72 has at least one of the first flare feature, the second flare feature, and the third flare feature. That is, it is determined that the paint candidates 71, 72 are determined to be flare paint candidates. The determiner 32 is responsible for executing step S103.

At step S104, the line marking identification apparatus 3 performs connection processing described later to sequentially connect the paint candidates determined as line marking paints to generate connection lines. In the example of FIG. 3, the line marking identification apparatus 3 generates connection lines 91, 92, 93. The connector 33 is responsible for executing step S104.

At step S105, the line marking identification apparatus 3 selects marking connection lines in the captured image. In the example of FIG. 3, the line marking identification apparatus 3 selects connection lines 91, 92 as marking connection lines. The selector 34 is responsible for executing step S105.

At step S106, the line marking identification apparatus 3 identifies lane markings. In the example of FIG. 3, the line marking identification apparatus 3 calculates marking parameters of the connection lines 91, 92 to identify lane markings. The identifier 35 is responsible for executing step S106. Thereafter, the process flow of FIG. 2 ends.

Figure 4:
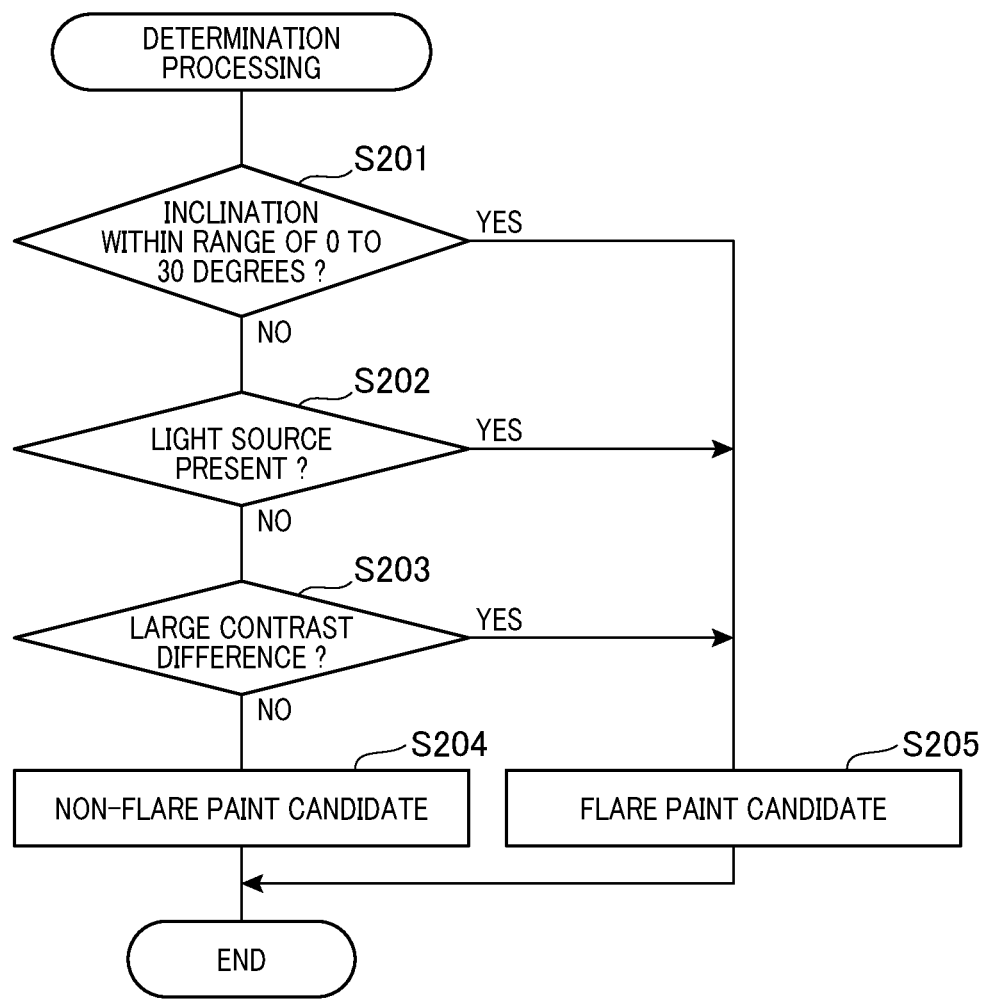
FIG. 4 is a flowchart of flare feature determination processing of the first embodiment.

Subsequently, flare feature determination processing performed by the line marking identification apparatus 3 at step S103 will now be described with reference to a flowchart of FIG. 4. This flare feature determination processing is performed for each paint candidate extracted at step S102.

At step S201, the line marking identification apparatus 3 determines, for each paint candidate, whether or not the inclination of the paint candidate is within a range of 0 to 30 degrees. In the captured image 200 shown in FIG. 3, the paint candidate 72 has a first line 74 that is a left side line and a second line 75 that is a right side line. The inclination of the second line 75 that is a closer-to-vehicle edge line to the vertical direction in the captured image 200 is within the range of 0 to 30 degrees. Therefore, the paint candidate 72 has the first flare feature. Similarly, the paint candidate 71 also has the first flare feature. None of the paint candidates 61-66, 81 have the first flare feature.

If at step S201 it is determined by the line marking identification apparatus 3 that the inclination of the paint candidate is not within the range of 0 to 30 degrees, the process flow proceeds to step S202. If at step S201 it is determined by the line marking identification apparatus 3 that the inclination of the paint candidate is within the range of 0 to 30 degrees, the process flow proceeds to step S205.

At step S202, the line marking identification apparatus 3 determines whether or not there is a light source located at the longitudinal extent of the paint candidate in the captured image. In the captured image 200 shown in FIG. 3, there is a headlight light 73 (as a light source) located at the longitudinal extent of each of the paint candidates 71, 72. Therefore, an area including the headlight 73 of each of paint candidates 71, 72 has a higher luminance value than a predetermined luminance value. The upper end of the closer-to-vehicle edge line of the paint candidate 71 excluding the headlight 73 is in contact with the headlight 73. The upper end of the closer-to-vehicle edge line 75 of the paint candidate 72 excluding the headlight 73 is in contact with the headlight 73. Since there is the light source 73 located at the longitudinal extent of each of the paint candidates 71, 72, each of the paint candidates 71, 72 has the second flare feature. None of the paint candidates 61-66, 81 have the second flare feature.

If at step S202 it is determined by the line marking identification apparatus 3 that there is no light source located at the longitudinal extent of the paint candidate in the captured image, the process flow proceeds to step S203. If at step S202 it is determined by the line marking identification apparatus 3 that there is a light source located at the longitudinal extent of the paint candidate in the captured image, the process flow proceeds to step S205.

At step S203, the line marking identification apparatus 3 determines whether or not the contrast of the paint candidate is significantly different from the contrast of each of peripheral paint candidates. In the captured image 200 shown in FIG. 3, assuming that the paint candidate 72 is a paint candidate to be determined, the paint candidates 62, 63 are found as peripheral paint candidates for the paint candidate 72. The contrast of each of the paint candidates 62, 63 that are line marking paints is significantly different from the contrast of the paint candidate 72 that is a flare paint candidate. Therefore, the number of paint candidates whose contrast is within a range of interest is one (i.e., the paint candidate 72). The number of paint candidates whose contrast is outside the range of interest is two (i.e., the paint candidates 62, 63). Therefore, the number of paint candidates having a contrast within the range of interest is less than the number of paint candidates having a contrast outside the range of interest. Thus, the paint candidate 72 has the third flare feature while none of the paint candidates 61-66, 81 have the third flare feature.

If at step S203 it is determined by the line marking identification apparatus 3 that the contrast of the paint candidate is significantly different from the contrast of each of the peripheral paint candidates, the process flow proceeds to step S205. If at step S203 it is determined by the line marking identification apparatus 3 that the contrast of the paint candidate is not significantly different from the contrast of any one of the peripheral paint candidates, the process flow proceeds to step S204.

After it is determined by the line marking identification apparatus 3 at step S204 that the paint candidate has none of the first to third flare features, the process flow ends. In the example of FIG. 3, it is determined that each of the paint candidates 61-66, 81 has no flare features.

After it is determined by the line marking identification apparatus 3 at step S205 that the paint candidate has at least one of the first to third flare features, the process flow ends. In the example of FIG. 3, each of the paint candidates 71, 72 has at least one of the first to third flare features. Therefore, each of the paint candidates 71, 72 is determined as a flare paint candidate.

Figure 5:
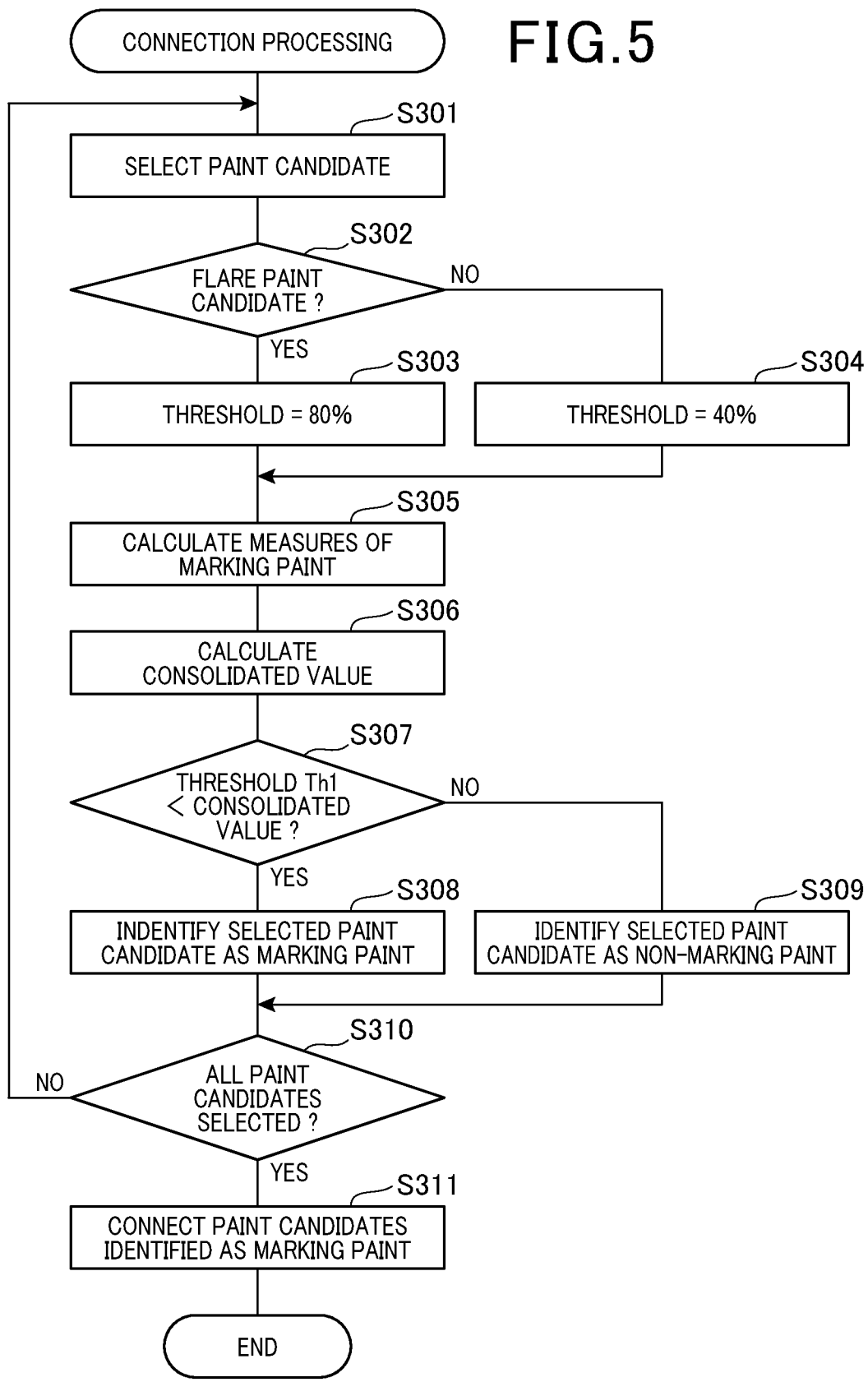
FIG. 5 is a flowchart of connection processing of the first embodiment.

Subsequently, connection processing performed by the line marking identification apparatus 3 at step S104 will now be described with reference to a flowchart of FIG. 5. This connection processing is performed for each paint candidate on which flare feature determination processing of step S103 was performed.

At step S301, the line marking identification apparatus 3 selects one of the paint candidates to perform connection processing. At step S302, the line marking identification apparatus 3 determines whether not the selected paint candidate is a flare paint candidate. If it is determined that the selected paint candidate is a flare paint candidate, the process flow proceeds to step S303. At step S303, the line marking identification apparatus 3 sets the threshold Th1 to 80%. If it is determined that the selected paint candidate is not a flare paint candidate, the process flow proceeds to step S304. At step S304, the line marking identification apparatus 3 sets the threshold Th1 to 40%. Thereafter, the process flow proceeds to step S305.

At step S305, the line marking identification apparatus 3 calculates three types of measures for the selected paint candidate. At step S306, the line marking identification apparatus 3 calculates a consolidated value of these three types of measures.

At step S307, the line marking identification apparatus 3 determines whether or not the consolidated value is greater than the threshold Th1. If at step S307 it is determined that the consolidated value is greater than the threshold Th1, then the process flow proceeds to step S308. At step S308, the line marking identification apparatus 3 determines that the selected paint candidate is line marking paint. If at step S307 it is determined that the consolidated value is equal to or less than the threshold Th1, then the process flow proceeds to step S309. At step S309, the line marking identification apparatus 3 determines that the selected paint candidate is not line marking paint. Thereafter, the process flow proceeds to step S310.

At step S310, the line marking identification apparatus 3 determines whether or not all the paint candidates have been selected. If at step S310 it is determined that all the paint candidates have been selected, then the process flow proceeds to step S311. If at step S310 it is determined that at least one of the paint candidates has not been selected, then the process flow returns to step S301.

In the example of FIG. 3, the line marking identification apparatus 3 selects one of paint candidates 61-66, 71, 72, 81 at step S301, and for the selected paint candidate, performs processing of steps S302-S310. The line marking identification apparatus 3 repeatedly performs this processing until all of the paint candidates 61-66, 71, 72, 81 are selected.

For each of the flare candidates 71,72, both of which are flare paint candidates, the process flow proceeds to step S303, where the threshold Th1 is set to 80%. Thus, the consolidated value of each of the paint candidates 71,72 does not exceed the threshold Th1, then the process flow proceeds to step S309, where none of the paint candidates 71,72 are identified as line marking paints. For each of the paint candidates 61-66, 81 determined as paint candidates having no flare features, the process flow proceeds to step S304, where the threshold Th1 is set to 40%. Thus, the consolidated value of each of the paint candidates 61-66, 81 exceeds the threshold Th1 and then the process flow proceeds to step S308, where each of the paint candidates 61-66, 81 is identified as line marking paint.

At step S311, the line marking identification apparatus 3 connects the paint candidates in sequence identified as line marking paints, thereby generating connection lines. Thereafter, the process flow ends. In the example of FIG. 3, the line marking identification apparatus 3 sequentially connects closer-to-vehicle edge lines of the paint candidates 61-63 identified as line marking paints to generate a connection line 91. More specifically, based on information regarding the previously identified lane markings, for example, to follow shapes of the previously identified lane markings that have been identified, the line marking identification apparatus 3 connects the upper end of the closer-to-vehicle edge line of the paint candidate 61 and the lower end of the closer-to-vehicle edge line of the paint candidate 62. Subsequently, in a similar manner as applied to the paint candidates 61, 62, based on information regarding the previously identified lane markings, the line marking identification apparatus 3 connects the upper end of the closer-to-vehicle edge line of the paint candidate 62 and the lower end of the closer-to-vehicle edge line of the paint candidate 63 to generate a connection line 91. In a similar manner as applied to the paint candidates 61-63, the line marking identification apparatus 3 connects closer-to-vehicle edge lines of the paint candidate 64-66 to generate a connection line 92. The line marking identification apparatus 3 identifies a closer-to-vehicle edge line of the paint candidate 81 as a connection line 93.

1-3. Advantages

The first embodiment can provide the following advantages.

(1A) The line marking identification apparatus 3 determines, for each paint candidate, whether or not the paint candidate has at least one flare feature, and subsequently determine whether or not the paint candidate is line marking paint. That is, even if it is determined in the flare feature determination processing that a paint candidate has at least one flare feature, the paint candidate is identified as line marking paint if the consolidated value of the paint candidate is equal to or greater than the threshold Th1.

That is, for example, setting a wider range that a paint candidate is determined as flare to detect more flare paint candidates in the captured image may increase the number of paint candidates incorrectly determined to be flare paint candidates. Setting a narrower range that a paint candidate is determined as flare to prevent such a misidentification may increase the number of flare paint candidates incorrectly determined to be line marking paints. If such a range that a paint candidate is determined as flare is narrowed in the example of FIG. 3, the flare paint candidate 72 may be incorrectly determined to be line marking paint, which may result in generation of a connection line A (indicated by the dotted line) that is different in shape from a lane marking.

In the present embodiment, even if it is determined that a paint candidate that is line marking paint is incorrectly determined to have at least one flare feature, such paint candidate may be identified as line marking paint if the consolidated value of the paint candidate is equal to or greater than the threshold Th1. With this configuration, the line marking identification apparatus 3 of the present embodiment can accurately identify line markings.

(1B) In the line marking identification apparatus 3 of the present embodiment, a sufficient condition for a paint candidate to have a flare feature is that the paint candidate has the first flare feature. With the line marking identification apparatus 3, it can be determined with certainty that a paint candidate as flare has a flare feature. That is, an angle between the longitudinal direction of a paint candidate as line marking paint and the vertical direction in the captured image takes a large value. Therefore, it is likely that the longitudinal direction of a paint candidate as line marking paint is not close to the vertical direction in the captured image. An angle between the longitudinal direction of a paint candidate as flare and the vertical direction in the captured image takes a small value. That is, it is likely that the longitudinal direction of a paint candidate as flare is close to the vertical direction in the captured image. Therefore, it is likely to be determined that a paint candidate as a line marking does not have the first flare feature while it is likely to be determined that a paint candidate as flare has the first flare feature. Based on the first flare feature, the line marking identification apparatus 3 of the present embodiment can determine with certainty that a paint candidate as flare has a flare feature.

(1C) In the line marking identification apparatus 3 of the present embodiment, a sufficient condition for a paint candidate to have a flare feature is that the paint candidate has the second flare feature. With the line marking identification apparatus 3, it can be determined with certainty that a paint candidate as flare has a flare feature. That is, a light source may often be located at the longitudinal extent of a paint candidate as flare in the captured image. Therefore, it is likely to be determined that a paint candidate as a line marking does not have the second flare feature while it is likely to be determined that a paint candidate as flare has the second flare feature. Based on the second flare feature, the line marking identification apparatus 3 of the present embodiment can determine with certainty that a paint candidate as flare has a flare feature.

(1D) In the line marking identification apparatus 3 of the present embodiment, a sufficient condition for a paint candidate to have a flare feature is that the paint candidate has the third flare feature. With the line marking identification apparatus 3, it can be determined with certainty that a paint candidate as flare has a flare feature. That is, luminance values of a plurality of line marking paints that are line markings together forming a broken line may often be equal or close to each other. Therefore, it is likely to be determined that a paint candidate as a line marking does not have the third flare feature while it is likely to be determined that a paint candidate as flare has the third flare feature. Based on the third flare feature, the line marking identification apparatus 3 of the present embodiment can determine with certainty that a paint candidate as flare has a flare feature.

In the first embodiment, the line marking identifier 36 is responsible for executing steps S104 (steps S301-S311), S105, and S106.

2. Second Embodiment

A second embodiment will be now described. The present embodiment is different from the first embodiment only in that flare feature determination processing regarding the inclination of a flare paint candidate is additionally included in the connection processing described above. Thus, only differences from the first embodiment are described.

The inclination of a paint candidate as line marking paint in a captured image may normally be equal or close to the inclination of the line marking that is a lane marking identified from the immediately previous captured image. In consideration of this fact, the line marking identification apparatus 3 performs additional processing to determine that a flare paint candidate whose inclination is significantly different from the inclination of the line marking identified from the immediately previous captured image is not line marking paint. For an illustration purpose, the last captured image is referred to as a first captured image, and the immediately previous captured image to the last captured image is referred to as a second captured image.

2-1. Processing

Connection processing of the second embodiment will now be described with reference to a flowchart of FIG. 6. The connection processing of the second embodiment is different from that of the first embodiment shown in FIG. 5 only in that processing of step S403 is newly added. That is, the processing of steps S401-S402, S404-S412 is similar to the processing of steps S301-S302, S303-S311.

Figure 7:
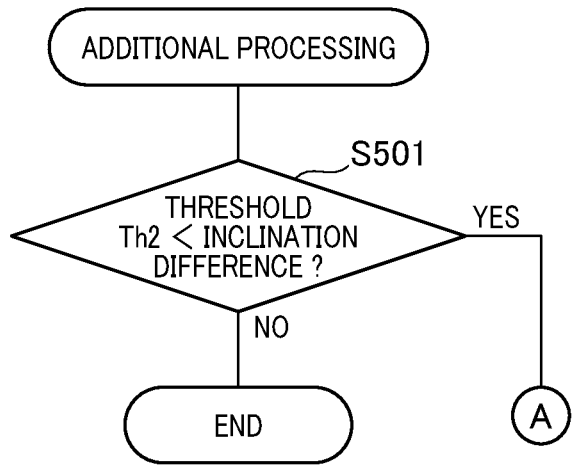
FIG. 7 is a flowchart of additional processing of the second embodiment.

Additional processing of step S403 performed by the line marking identification apparatus 3 will now be described with reference to a flowchart of FIG. 7. The additional processing is performed at step S402 on a flare paint candidate.

At step S501, the line marking identification apparatus 3 compares a first inclination that is the inclination of a flare paint candidate in a top-view image of the first captured image and a second inclination that is the inclination of the previous identified line marking in a top-view image of the second captured image to calculate a difference between the first inclination and the second inclination. The top-view image is an image obtained by converting the captured image into an image as viewed from the top of the vehicle. Subsequently, the line marking identification apparatus 3 determines whether or not the difference between the first inclination and the second inclination is greater than a threshold Th2. If it is determined that the difference between the first inclination and the second inclination is greater than the threshold Th2, the process flow proceeds to step S410. Thereafter, the process flow of the additional processing ends. That is, a flare paint candidate whose inclination is significantly different from the inclination of the previous identified line marking is not determined to be line marking paint. If it is determined that the difference between the first inclination and the second inclination is equal to or less than the threshold Th2, the process flow proceeds to step S404. Thereafter, Thereafter, the process flow of the additional processing ends. That is, similar processing as in the first embedment is performed on a flare paint candidate whose inclination is slightly different from the inclination of the previous identified line marking.

2-2. Advantages

The second embodiment described as above can provide the following advantage.

(2A) The line marking identification apparatus 3 is configured to perform the additional processing, thereby excluding flare paint candidates that are likely to be non-line marking paints from flare paint candidates to be processed at steps S404-S408 prior to setting the threshold Th1 at step 405. This configuration can further reduce the misidentification of the line markings.

In the second embodiment, the line marking identifier 36 is responsible for executing steps S104 (steps S401-S412), S105, and S106. The first inclination corresponds to a first feature, and the second inclination corresponds to a second feature. The previous identified line marking corresponds to a second line marking. A condition that the inclination difference exceeds the threshold Th2 corresponds to a predetermined determination condition.

3. Third Embodiment

A third embodiment will be now described. The present embodiment is different from the second embodiment only in that, in the case of a broken line, determination processing regarding a length of a flare paint candidate and a spacing between the flare paint candidate and another paint candidate is added as an alternative to the additional processing of the second embodiment. Thus, only differences from the second embodiment are described.

A spacing between paint candidates that broken-line marking paints may normally be equal or close to the spacing between the previous identified broken-line markings. Similarly, a length of each of broken-line marking paints may normally be equal or close to the length of each of the previous identified broken-line markings. In consideration of these facts, the line marking identification apparatus 3 performs additional processing to determine that a flare paint candidate having at least one of a large length difference and a large spacing difference from the previous identified line markings is not line marking paint.

3-1. Processing

Figure 6:
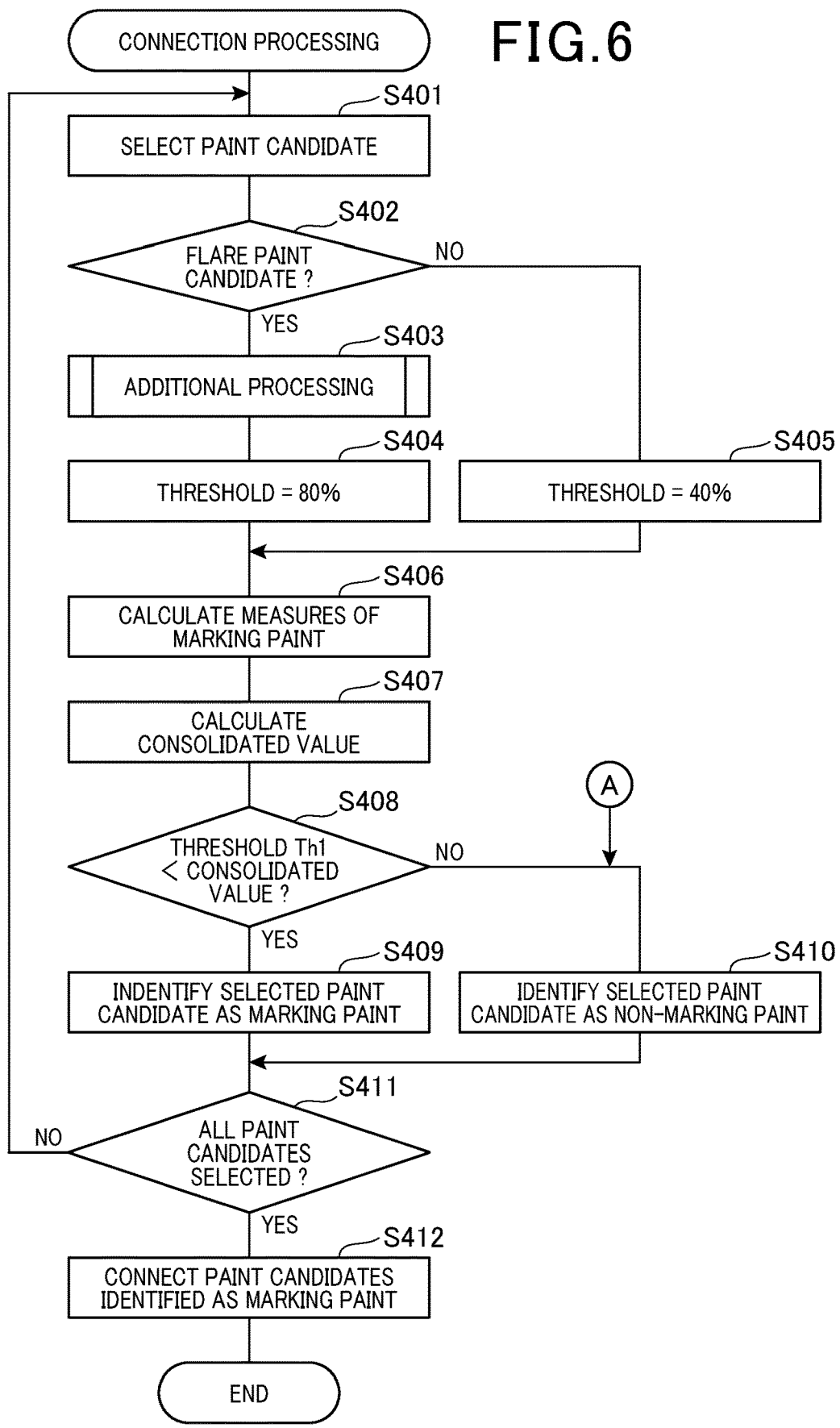
FIG. 6 is a flowchart of connection processing in accordance with a second embodiment of the present disclosure.

Connection processing of the third embodiment is similar to connection processing of the second embodiment shown in FIG. 6 except in that additional processing of step S403 is modified.

Figure 8:
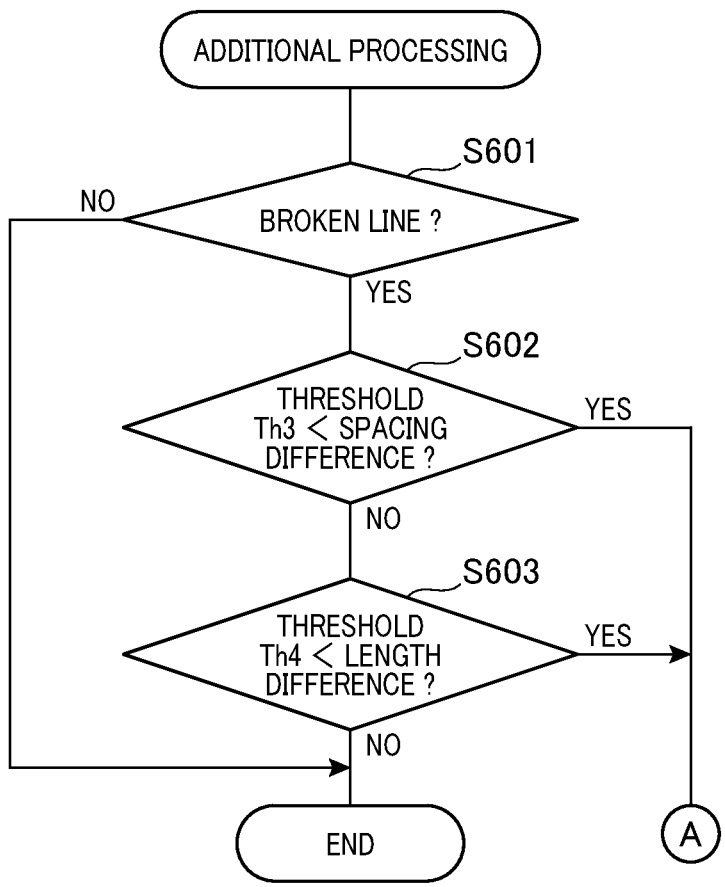
FIG. 8 is a flowchart of additional processing in accordance with a third embodiment of the present disclosure.

Additional processing of step S403 performed by the line marking identification apparatus 3 will now be described with reference to a flowchart of FIG. 8.

At step S601, the line marking identification apparatus 3 determines whether or not the previous identified line marking is a broken line. If it is determined that the previous identified line marking is a broken line, the process flow proceeds to step S602. If it is determined that the previous identified line marking is not a broken line, the process flow proceeds to step S404.

At step S602, the line marking identification apparatus 3 calculates a first spacing that is a spacing between a closer-to-vehicle edge line of a flare paint candidate and a closer-to-vehicle edge line of another paint candidate located peripheral to the flare paint candidate in the vertical direction in the top-view image of the first captured image. The line marking identification apparatus 3 further calculates a second spacing that is a spacing between closer-to-vehicle edge lines of the previously identified broken-line markings in the vertical direction in the top-view image of the second captured image. The line marking identification apparatus 3 compares the first spacing and the second spacing to calculate a spacing difference therebetween, and determines whether or not the spacing difference is greater than a threshold Th3. If it is determined that the spacing difference is greater than the threshold Th3, then the process flow proceeds to step S410. Thereafter, the process flow of this additional processing ends. That is, a flare paint candidate having a large spacing difference from the previous identified line marking is not determined to be line marking paint. If it is determined that the spacing difference is equal to or less than the threshold Th3, then the process flow proceeds to step S603.

At step S603, the line marking identification apparatus 3 compares a length of the closer-to-vehicle edge line of the flare paint candidate in the top-view image of the first captured image and a length of the closer-to-vehicle edge lines of the previously identified line marking in the top-view image of the second captured image to calculate a length difference therebetween, and determines whether or not the length difference is greater than the threshold Th4. If it is determined that the length difference is greater than the threshold Th4, then the process flow proceeds to step S410. Thereafter the process flow of this additional processing ends. That is, a flare paint candidate having a large length difference from the previous identified line marking is not determined to be line marking paint. If it is determined that the length difference is equal to or less than the threshold Th4, then the process flow proceeds to step S404. Thereafter the process flow of this additional processing ends. That is, similar processing as in the first embodiment is performed on a flare paint candidate whose closer-to-vehicle edge line length is slightly different from that of the previous identified line marking.

3-2. Advantages

The third embodiment can provide the following advantage.

(3A) The line marking identification apparatus 3 performs additional processing using the fact that lengths of line marking paints of a broken line are substantially equal to each other and spacings between line marking paints of a broken line are substantially equal to each other to determine whether or not flare paint candidate is line marking paint. The line marking identification apparatus 3 is configured to perform the additional processing, thereby excluding flare paint candidates that are likely to be non-line marking paints from flare paint candidates to be processed at steps S404-S408 prior to setting the threshold Th1 at step S404 or S405. This configuration can further reduce the misidentification of the line markings.

In the third embodiment, the line marking identifier 36 is responsible for executing steps S104 (steps S401-S412), S105, and S106. The first spacing and the length of the closer-to-vehicle edge line of the flare paint candidate in the top-view image of the first captured image correspond to a first feature, and the second spacing and the length of the closer-to-vehicle edge line of the previous identified line marking in the top-view image of the second captured image corresponds to a second line marking. The condition that the spacing difference exceeds the threshold Th3 and the length difference exceeds the threshold Th4 corresponds to a predetermined determination condition.

4. Modifications

It is to be understood that the invention is not to be limited to the specific embodiment disclosed above and that modifications and other embodiments are intended to be included within the scope of the appended claims. For an illustration purpose, as in the second embodiment, the last captured image is referred to as a first captured image, and the immediately previous captured image to the last captured image is referred to as a second captured image.

(4A) In the additional processing of the present disclosure, to compare the first and second features, the inclination difference is calculated in the above second embodiment, and the spacing difference and the length difference are calculated in third embodiment. In an alternative embodiment, other features may be compared.

For example, in the additional processing, a shape of a tentative connection line generated under assumption that flare paint candidates are deemed as line marking paints and a shape of the previous identified line marking may be compared. More specifically, the line marking identification apparatus may generate a tentative connection line in the first captured image by sequentially connecting the flare paint candidates and other paint candidates identified as line marking paints. Subsequently, the line marking identification apparatus may calculate parameters of the tentative connection line in the top-view image of the first captured image. In this example, the line marking identification apparatus may calculate the inclination of the tentative connection line as the first feature. The line marking identification apparatus may calculate the inclination of the previous identified line marking in the top-view image of the second captured image as the second feature. If a parameter difference between the first and second features exceeds a threshold, the line marking identification apparatus may determine that the flare paint candidate is not line marking paint. Instead of using the inclination as a parameter, other parameters, such as a curvature, a yaw angle, a clothoid, may be used. In an alternative embodiment, in the additional processing, a difference between various calculated parameters may be combined to compare the first and second features.

For example, in addition to the first and second features, a third feature may further be calculated to determine whether or not a flare paint candidate is line marking paint. The third feature may be the inclination of the tentative connection line generated by sequentially connecting paint candidates identified as line marking paint, other than the flare paint candidates. The line marking identification apparatus may calculate a first difference in parameter between the first feature and the second feature, a second difference in parameter between the second feature and the third feature, and if the first difference is greater than the second difference, then determine that the flare paint candidate is not line marking paint.

(4B) Additionally or alternatively to the additional processing, for example, assuming that previous identified, left-side and right-side line markings of a lane in which the vehicle 100 is traveling are both curved lines, the line marking identification apparatus may be configured to, if a flare paint candidate is located near one of the two curved lines which has a larger curvature radius, determine that the flare paint candidate is not line marking paint.

Additionally or alternatively to the additional processing, the line marking identification apparatus may use the fact that shapes of the left and right line markings are similar to each other to determine that a flare paint candidate is not line marking paint. More specifically, for example, the line marking identification apparatus may select two tentative connection lines that correspond to the left-side and right-side line markings of a lane in which the vehicle 100 is traveling, from tentative connection lines generated by sequentially connecting paint candidates identified as line marking paints without using flare paint candidates, and calculate a first degree of similarity between shapes of the two tentative connection lines. The line marking identification apparatus may further calculate two tentative connection lines by sequentially connecting flare paint candidates and paint candidates identified as line marking paints and calculate a second degree of similarity between shapes of the two tentative connection lines. The line marking identification apparatus may determine that the flare paint candidate is not line marking paint if a difference between the first and second degrees of similarity exceeds a predetermined threshold.

In an alternative embodiment, the degree of similarity may be calculated based on a spacing or a degree of parallelism between the two tentative connection lines. In addition, the degree of similarity between the two tentative connection lines may be calculated based on a curvature, a yaw angle, or a clothoid of each of the two tentative connection lines or may be calculated by combining various parameters.

(4C) In the above embodiments, the identification condition in the connection processing is that the consolidated value exceeds the threshold Th1.

In an alternative embodiment, the identification condition in the connection processing may be that a degree of similarity calculated by comparing a shape of the tentative connection line defined in (4A) and a shape of a geographical lane marking exceeds a threshold. The geographical line marking is a lane marking on a map registered in a vehicle-mounted navigation system or the like. The threshold is set to determine whether or not the tentative connection line is the same as the lane marking. For example, the line marking identification apparatus may generate a tentative connection line by sequentially connecting the paint candidates and other paint candidates identified as line marking paints. Subsequently, the line marking identification apparatus may calculate a degree of similarity between the tentative connection line in the top-view image of the captured image and a shape of the geographical lane marking to determine whether or not the calculated degree of similarity exceeds the threshold.

For example, the identification condition may be a condition that the degree of similarity calculated by comparing a shape of the tentative connection line and a shape of a trajectory of a preceding vehicle traveling ahead of the vehicle 100 exceeds a predetermined threshold.

The degree of similarity may be calculated by comparing inclinations, curvatures, yaw angles, or clothoids of the tentative connection line, a lane marking or a trajectory of a preceding vehicle, or by combining various parameters.

(4D) In the above embodiments, the marking paint features for which measures are calculated include the inclination, a location, and a width of a paint candidate. Other features of line marking paint may include a color, a line thickness, a luminance value, or the number of edge points included in a left and a right edge line of the paint candidate.

In the above embodiments, the three types of measures are calculated. In an alternative embodiment, more than three types of measures may be calculated.

(4E) In the above embodiments, as a more stringent identification condition, the threshold for the flare paint candidates is set higher than a threshold for the paint candidates having no flare features. In an alternative embodiment, for example, as a more stringent identification condition, the consolidated value for a flare paint candidate may be calculated to be lower than the consolidated value for a paint candidate having no flare features. In such an embodiment, the more features, of the first to third flare features, the flare paint candidate has, the lower value the consolidated value may be calculated to be.

(4F) In the above embodiments, a determination condition used to determine that a paint candidate is a flare paint candidate is that the paint candidate has at least one of the first to third flare features. In an alternative embodiment, the determination condition used to determine that a paint candidate is a flare paint candidate may be that the paint candidate has at least two of the first to third flare features or may be that the paint candidate has all of the first to third flare features.

(4G) In the above embodiments, predefined flare features include the first to third flare features.

In many cases, flare caused by strong light emitted from headlights of an oncoming vehicle has a longitudinally short length. Thus, additionally or alternatively to three flare features used in the flare feature determination processing, a flare feature may be used that a length of a paint candidate, more specifically, a length of the closer-to-vehicle edge line of a paint candidate is equal to or less than a predetermined threshold.

For example, flare caused by strong light emitted from headlights of an oncoming vehicle may often be linear shaped. Therefore, additionally or alternatively to the flare features used in the flare feature determination processing, a flare feature may be used that a curvature of a paint candidate, more specifically, a curvature radius of an edge line of a paint candidate exceeds a predetermined threshold.

For example, flare caused by strong light emitted from headlights of an oncoming vehicle may often be located outside the lane line markings. Therefore, additionally or alternatively to the flare features used in the flare feature determination processing, a flare feature may be used that, when the previous identified line marking in the second captured image is overlaid on the first captured image, a flare paint candidate is located outside the previous identified line markings. In addition, additionally or alternatively to the additional processing, it may be determined that, when the previous identified line marking in the second captured image is overlaid on the first captured image, a paint candidate located outside the previous identified line markings is not line marking paint.

In addition, flare caused by strong light emitted from headlights of an oncoming vehicle may often be captured as being moving over a plurality of captured images. Therefore, additionally or alternatively to the flare features used in the flare feature determination processing, a flare feature may be used that, when comparing a plurality of images captured immediately previous to the first captured image, including the second image, a flare paint candidate is captured as being moving. Additionally or alternatively to the additional processing, it may be determined that, when comparing a plurality of images captured immediately previous to the first captured image, including the second image, a flare paint candidate captured as being moving is not line marking paint.

(4H) In the above embodiments, the inclination of a paint candidate is within a range of 0 to 30 degrees in the captured image as an example of a predetermined inclination range. In an alternative embodiment, the inclination of a paint candidate may be within a range of 0 to 45 degrees.

(4I) In the above embodiments, the third flare feature is that a contrast of a paint candidate is much higher than contrasts of peripheral paint candidates. In alternative embodiment, the third flare feature may be that a contrast of a paint candidate is higher than contrasts of peripheral paint candidates. In another alternative embodiment, a contrast of a paint candidate to be determined may be compared with a contrast of one of the peripheral paint candidates.

(4J) In the above second embodiment, a difference between the inclination of a flare paint candidate in a top-view image of the first captured image and the inclination of the previous identified line marking in a top-view image of the second captured image is calculated. In an alternative embodiment, for example, a difference between the inclination of a flare paint candidate in the first captured image and the inclination of the previous identified line marking in the second captured image may be calculated.

(4K) In the connection processing of the above second embodiment, if it is determined in the additional processing that an inclination difference is equal to or less than the threshold Th2, the threshold Th1 is set to a higher value as a more stringent condition at step S404. Additionally or alternatively to increasing the threshold Th1, a degree of inclination of a paint candidate may be calculated to be a lower value, where the extent to which lower degree of inclination of the paint candidate may be changed in response to the magnitude of the inclination difference.

(4L) In the connection processing of the above third embodiment, it is determined in the additional processing that a flare paint candidate having at least one of a length difference and a spacing difference from the previous identified line marking greater than a predetermined threshold is not line marking paint. In an alternative embodiment, it may be determined in the additional processing that a flare paint candidate having either or both of a length difference and a spacing difference from the previous identified line marking greater than a predetermined threshold is not line marking paint.

(4M) In the additional processing of the above third embodiment, if it is determined that a spacing difference is equal to or less than the threshold Th3 and a length difference is equal to or less than the threshold Th4, the threshold Th1 is set to a higher value as a more stringent condition at step S404. Additionally or alternatively to increasing the threshold Th1, the consolidated value of a paint candidate may be calculated to be a lower value, where the extent to which lower consolidated value of the paint candidate may be changed in response to the magnitude of length difference and the magnitude of spacing difference.

(4N) The functions of a single component may be distributed to a plurality of components, or the functions of a plurality of components may be consolidated into a single component. At least part of the configuration of the above embodiments may be replaced with a known configuration having a similar function. At least part of the configuration of the above embodiments may be removed. At least part of the configuration of one of the above embodiments may be replaced with or added to the configuration of another one of the above embodiments. While only certain features of the disclosure have been illustrated and described herein, many modifications and changes will occur to those skilled in the art. It is, therefore, to be understood that the appended claims are intended to cover all such modifications and changes as falling within the true spirit of this disclosure.

(4O) It should be appreciated that the present disclosure is not to be limited to line marking identification apparatus disclosed above and that the present disclosure can be implemented in numerous ways, including as a system that includes the line marking identification apparatus as a component, a program for enabling a computer to function as any one of the line marking identification apparatus, a non-transitory computer readable storage medium storing such a program, a line marking identification method and the like.

What is claimed is:

1. An apparatus for identifying a line marking on a road surface, comprising: an extractor configured to extract a paint candidate that is a candidate for road surface paint used to identify a line marking in an image captured by a camera mounted on a vehicle;
    a determiner configured to determine whether or not the paint candidate has at least one predefined flare feature; and a line marking identifier configured to identify a line marking when the paint candidate meets an identification condition used to identify a line marking,
    wherein the line marking identifier is configured to set the identification condition to be more stringent for a flare paint candidate for which the paint candidate is determined by the determiner to have the at least one predefined flare feature than for which the paint candidate is determined by the determiner to have no predefined flare feature.

2. The apparatus according to claim 1, wherein
    the determiner is configured to at least determine whether or not an inclination of the paint candidate in the captured image is within a predefined range, thereby determining whether or not the paint candidate has at least one predefined flare feature.

3. The apparatus according to claim 1, wherein
    the determiner is configured to at least determine whether or not there is a light source located at a longitudinal extent of the paint candidate in the captured image, thereby determining whether or not the paint candidate has at least one predefined flare feature.

4. The apparatus according to claim 1, wherein
    the determiner is configured to at least determine whether or not a difference between a contrast of the paint candidate and a contrast of another paint candidate peripheral to the paint candidate is equal to or greater than a predefined threshold, thereby determining whether or not the paint candidate has at least one predefined flare feature.

5. The apparatus according to claim 1, wherein
    the line marking identifier is configured to compare a first feature that is a feature of a first line marking which is identified based on the flare paint candidate in a first captured image and a second feature that is a feature of a second line marking which is identified from a second captured image immediately previous to the first captured image and corresponds to the first line marking, and if a predefined condition that there is a large difference between the first and second features is met as a result of the comparison, withhold using the flare paint candidate in lane marking identification.

6. The apparatus according to claim 5, wherein the first feature is an inclination of the flare paint candidate in the first captured image, and the second feature is an inclination of the second line marking identified from the second captured image.

7. The apparatus according to claim 5, wherein the first feature is a spacing between the flare paint candidate and another paint candidate peripheral to the flare paint candidate in the first captured image, and the second feature is a spacing between line markings of a broken line identified from the second captured image.

8. The apparatus according to claim 5, wherein the first feature is a length of the flare paint candidate in the first captured image, and the second feature is a length of each line segment of a broken line forming the second line marking identified from the second captured image.

9. An apparatus for identifying a line marking on a road surface from an image captured by a camera mounted on a vehicle, comprising:
an extractor, using a processor, configured to extract a paint candidate that is a candidate for road surface paint used to identify a line marking in an image captured by the camera mounted on the vehicle;
a determiner, using a processor, configured to determine whether or not the paint candidate has at least one predefined flare feature; and a line marking identifier, using a processor, configured to identify a line marking when the paint candidate meets an identification condition used to identify a line marking,
wherein the line marking identifier is configured to set the identification condition to be more stringent for a flare paint candidate for which the paint candidate is determined by the determiner to have the at least one predefined flare feature than for which the paint candidate is determined by the determiner to have no predefined flare feature.

10. A method for identifying a line marking on a road surface, comprising:
extracting a paint candidate that is a candidate for road surface paint used to identify a line marking in an image captured by a camera mounted on a vehicle;
determining whether or not the paint candidate has at least one predefined flare feature; and
identifying a line marking based on the paint candidate meeting an identification condition used to identify a line marking,
wherein identifying a line marking comprises setting the identification condition to be more stringent for a flare paint candidate for which the paint candidate has the at least one predefined flare feature than for which the paint candidate has no predefined flare feature.

* * * * *